US012646984B2

(12) United States Patent
Tanaka et al.

(10) Patent No.: US 12,646,984 B2
(45) Date of Patent: Jun. 2, 2026

(54) ROTOR, MOTOR INCLUDING SAME, AND MANUFACTURING METHOD OF ROTOR

(71) Applicant: NIDEC CORPORATION, Kyoto (JP)

(72) Inventors: Yosuke Tanaka, Kyoto (JP); Takeshi Honda, Kyoto (JP); Hirofumi Muto, Kyoto (JP); Hideki Tsuji, Kyoto (JP); Yuya Danjo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 307 days.

(21) Appl. No.: 18/475,210

(22) Filed: Sep. 27, 2023

(65) Prior Publication Data

US 2024/0113577 A1      Apr. 4, 2024

(30) Foreign Application Priority Data

Sep. 29, 2022    (JP) ................................. 2022-155728

(51) Int. Cl.
*H02K 1/276* (2022.01)
*H02K 15/03* (2006.01)

(52) U.S. Cl.
CPC ............. *H02K 1/276* (2013.01); *H02K 15/03* (2013.01)

(58) Field of Classification Search
None
See application file for complete search history.

(56) References Cited

U.S. PATENT DOCUMENTS 5,581,140 A * 12/1996 Futami ................... H02K 15/03
                                                            310/156.53
2015/0108866 A1    4/2015 Kaiser et al.

2015/0236558 A1* 8/2015 Oketani ................. H02K 1/276
                                                            310/43
2015/0364959 A1* 12/2015 Oketani ............... H02K 1/2706
                                                            310/156.11
2020/0106314 A1* 4/2020 Schulde ................. H02K 1/276
2020/0127539 A1* 4/2020 Nakahara ............... H02K 21/16
2021/0234419 A1* 7/2021 Okazaki ................. H02K 1/276

FOREIGN PATENT DOCUMENTS

| | | |
|---|---|---|
| DE | 102005041676 A1 | 3/2007 |
| JP | 5221030 B2 | 6/2013 |
| JP | 2013126330 A | 6/2013 |
| JP | 6714907 B2 | 7/2020 |

* cited by examiner

*Primary Examiner* — Oluseye Iwarere
*Assistant Examiner* — Masoud Vaziri
(74) *Attorney, Agent, or Firm* — HAUPTMAN HAM, LLP

(57) ABSTRACT

A rotor includes stacked core plates, a hole, and a magnet inserted into the hole. A holding core plate has a through hole as part of the hole, a protrusion protruding inwardly from an inner surface of the through hole and being in contact with the magnet, and a displacement permission portion located in an opposite direction to a protrusion direction of the protrusion and permitting displacement of the protrusion in the opposite direction. The rotor includes at least one of a magnet-side chamfered portion in which the front side edge portion of the magnet is chamfered or a protrusion-side chamfered portion in which the tip end edge portion of the protrusion is chamfered. A sum of lengths of the magnet-side and protrusion-side chamfered portions is equal to or longer than a length of the protrusion in the protrusion direction as the rotor is viewed from the axial direction.

11 Claims, 12 Drawing Sheets

OPPOSITE DIRECTION ⟵⟶ PROTRUSION DIRECTION

OPPOSITE DIRECTION ◄────────► PROTRUSION DIRECTION

START

MAGNET FORMING PROCESS — S1

CORE PLATE FORMING PROCESS — S2

CORE PLATE STACKING PROCESS — S3

MAGNET INSERTING PROCESS — S4

MAGNETIZING PROCESS — S5

END

AXIAL DIRECTION

PROTRUSION
DIRECTION

OPPOSITE
DIRECTION

OPPOSITE DIRECTION ◄─────────► PROTRUSION DIRECTION

1

ROTOR, MOTOR INCLUDING SAME, AND MANUFACTURING METHOD OF ROTOR

CROSS-REFERENCE TO RELATED APPLICATIONS

The present invention claims priority under 35 U.S.C. § 119 to Japanese Patent Application No. 2022-155728 filed on Sep. 29, 2022, the entire content of which is incorporated herein by reference.

FIELD OF THE INVENTION

The present invention relates to a rotor, a motor including the rotor, and a manufacturing method of the rotor.

BACKGROUND

There is a known rotor in which a magnet is inserted into a magnet insertion hole, the rotor configured that a part of an inner surface of the magnet insertion hole pushes the magnet toward the inside of the magnet insertion hole to hold the magnet in the magnet insertion hole. For example, conventionally, there is a known core of a rotating electrical machine in which a plurality of core plates each having an insertion hole is stacked, a permanent magnet is inserted into the insertion hole, a bridge portion between an outer peripheral portion of the core plate and an inner edge of the insertion hole is deformed on the permanent magnet side, and the bridge portion pushes the permanent magnet.

In the conventional configuration, the rotor holds the magnet inserted into the magnet insertion hole by a convex portion protruding from the inner surface of the magnet insertion hole. However, when the magnet is inserted into the magnet insertion hole, the magnet pushes a protrusion portion as the convex portion into the magnet insertion direction, so that a tip end portion of the protrusion portion may be plastically deformed into a state of being bent in the magnet insertion direction and held between the magnet and the magnet insertion hole. In a case where the tip end portion of the protrusion portion is held between the magnet and the magnet insertion hole, there is a possibility that the protrusion portion fails to appropriately hold the magnet. Such failing to appropriately hold the magnet may cause a decrease in the holding force of the magnet, damage of the magnet, and the like.

Therefore, for a rotor that holds a magnet inserted into a magnet insertion hole by a protrusion portion, a configuration that can appropriately hold the magnet is required.

SUMMARY

A rotor according to an embodiment of the present invention includes: a rotor core in a columnar shape having a plurality of core plates stacked in a thickness direction and a magnet insertion hole extending in an axial direction; and a magnet inserted into the magnet insertion hole. The plurality of core plates include a holding core plate having an insertion through hole constituting a part of the magnet insertion hole, a protrusion portion protruding from an inner surface of the insertion through hole toward an inside of the magnet insertion hole and being in contact with the magnet, and a displacement permission portion located in an opposite direction to a protrusion direction of the protrusion portion with respect to the protrusion portion and permitting displacement of the protrusion portion in the opposite direction. The magnet includes a front side edge portion on a front side in a magnet insertion direction, which is a direction in which the magnet is inserted into the magnet insertion hole, and on the protrusion portion side in the protrusion direction. The protrusion portion includes a tip end edge portion rearward in the magnet insertion direction at a tip end portion thereof. The rotor includes at least one of a magnet-side chamfered portion in which the front side edge portion of the magnet is chamfered and a protrusion portion-side chamfered portion in which the tip end edge portion of the protrusion portion is chamfered. A sum of a length of the magnet-side chamfered portion and a length of the protrusion portion-side chamfered portion is equal to or longer than a length of the protrusion portion in the protrusion direction of the protrusion portion as the rotor is viewed from the axial direction.

A motor according to an embodiment of the present invention includes a rotor having the above-described configuration, and a stator including a stator coil and a stator core.

A manufacturing method of a rotor according to an embodiment of the present invention is a manufacturing method of a rotor including: a rotor core in a columnar shape having a plurality of core plates stacked in a thickness direction and a magnet insertion hole extending in an axial direction; and a magnet to be inserted into the magnet insertion hole. This manufacturing method of a rotor includes: a magnet forming process of forming the magnet to be inserted into the magnet insertion hole; a plurality of core plates including a holding core plate having an insertion through hole constituting a part of the magnet insertion hole, a protrusion portion protruding from an inner surface of the insertion through hole toward an inside of the magnet insertion hole and being in contact with the magnet, and a displacement permission portion located in an opposite direction to a protrusion direction of the protrusion portion with respect to the protrusion portion and permitting displacement of the protrusion portion in the opposite direction; a core plate stacking process of stacking the plurality of core plates in a thickness direction to obtain the rotor core in a columnar shape having the magnet insertion hole extending in the axial direction; and a magnet inserting process of inserting the magnet into the magnet insertion hole of the rotor core while bringing the magnet and the protrusion portion into contact with each other. The manufacturing method of a rotor further includes at least one of a magnet-side chamfered portion forming process of forming a chamfered portion in the magnet by chamfering a front side edge portion of the magnet located on a front side in a magnet insertion direction, which is an insertion direction of the magnet with respect to the magnet insertion hole, and on the protrusion portion side in the protrusion direction, the magnet-side chamfered portion forming process being included in the magnet forming process, and a protrusion portion-side chamfered portion forming process of forming a chamfered portion in a tip end edge portion rearward in the magnet insertion direction at a tip end portion of the protrusion portion, the protrusion portion-side chamfered portion forming process being included in the core plate forming process. A sum of a length of the magnet-side chamfered portion and a length of the protrusion portion-side chamfered portion is equal to or longer than a length of the protrusion portion in the protrusion direction of the protrusion portion as the rotor is viewed from the axial direction.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 15 is a partially enlarged view of a protrusion portion of a holding core plate in the rotor according to the second embodiment;

DETAILED DESCRIPTION

Figure 1:
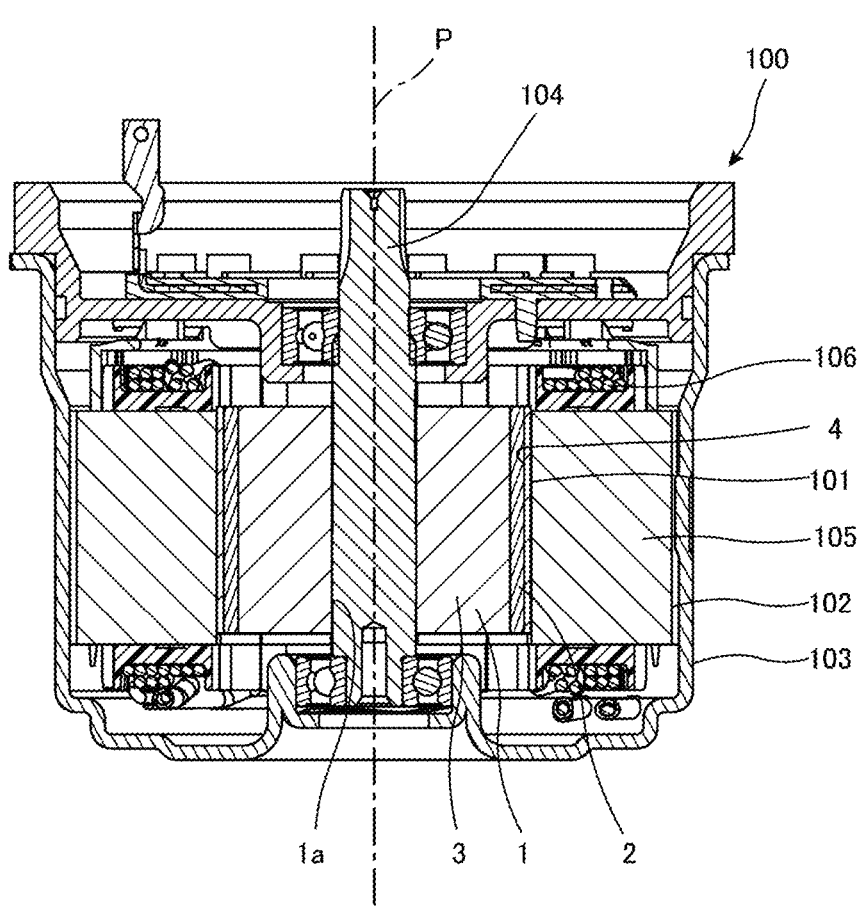
FIG. 1 is a sectional view showing a schematic configuration of a motor according to a first embodiment.

Hereinafter, exemplary embodiments of the present invention will be described with reference to the drawings. In the respective drawings, identical or corresponding portions are denoted with identical reference signs; therefore, the description thereof will not be given repeatedly. In addition, the respective drawings do not faithfully show the dimensions of actual constituent members, the dimensional ratios of the constituent members, and the like.

Hereinafter, in the description of a motor 100, a direction parallel to a center axis P of a rotor 101 is referred to as axial direction, a direction orthogonal to the center axis P is referred to as radial direction, and a direction along an arc about the center axis P is referred to as circumferential direction.

In the following description, a direction in which a magnet 2 is inserted into a magnet insertion hole 4 is referred to as magnet insertion direction. White arrows in the drawings indicate the magnet insertion direction. The magnet insertion direction is the same as the axial direction. However, these definitions are not intended to limit the orientation of the rotor 101 at the time of manufacturing and at the time of use.

In the following description, the term "same" is not limited to a case of being exactly the same, and may be the same as long as it includes a range that can be regarded as being substantially the same and to an extent of exhibiting the effect of the invention.

In the following description, expressions such as "fixed", "connected", and "attached" include not only cases where members are directly fixed to each other but also cases where members are fixed to each other via another member. That is, in the following description, the expressions of "fix" and the like include the meaning of direct and indirect fixation and the like of members.

An example of a motor 100 according to the first embodiment will be described with reference to FIG. 1. The motor 100 is an IPM motor.

As shown in FIG. 1, the motor 100 includes the rotor 101, a stator 102, a housing 103, and a shaft 104. The rotor 101 rotates about the center axis P with respect to the stator 102. In the present embodiment, the motor 100 is what is called an inner rotor type motor in which the rotor 101 is located in the stator 102 having a tubular shape rotatably about the center axis P.

The rotor 101 includes a rotor core 1 and the magnet 2. The rotor 101 is located radially inward of the stator 102 and is rotatable with respect to the stator 102 about the center axis P.

The stator 102 is accommodated in the housing 103. In the present embodiment, the stator 102 has a cylindrical shape. The rotor 101 is located radially inward of the stator 102. That is, the stator 102 is located to oppose the rotor 101 in the radial direction.

The stator 102 includes a stator core 105 and a stator coil 106. The stator coil 106 is wound around the stator core 105. Since the stator 102 has a known stator configuration, a detailed description thereof will be omitted.

Figure 2:
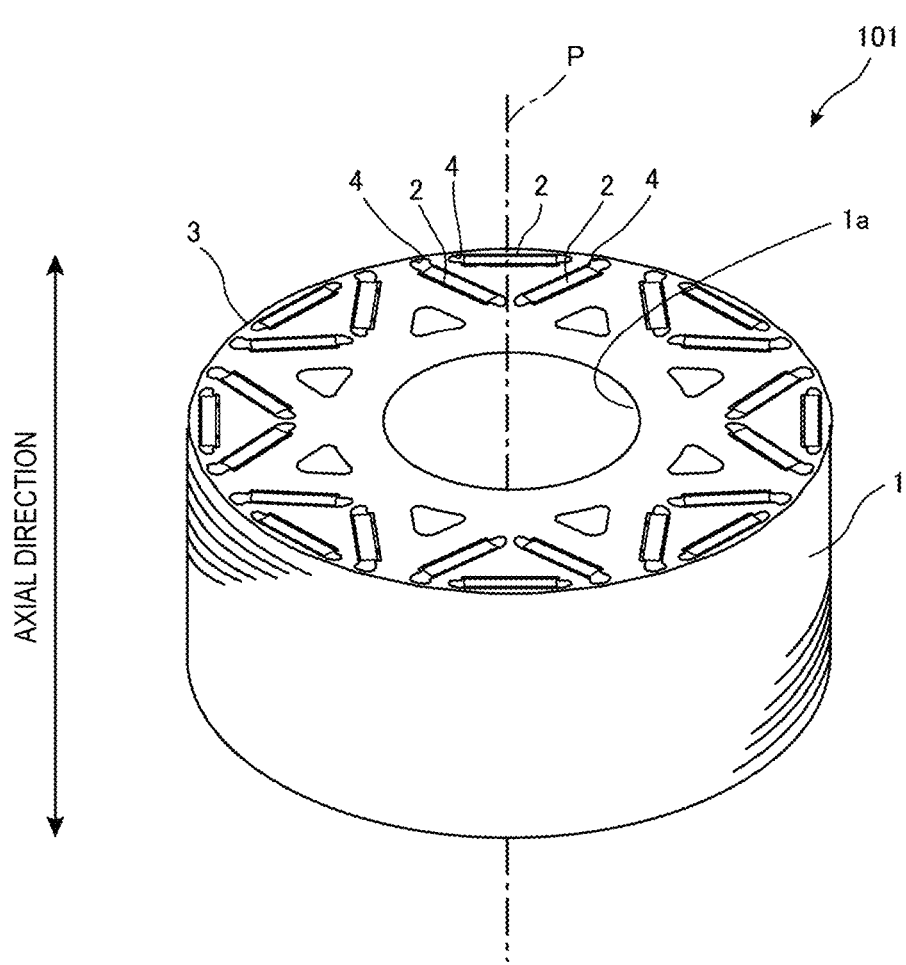
FIG. 2 is a perspective view of a rotor according to the first embodiment.

As shown in FIG. 2, the rotor 101 has a columnar shape extending along the center axis P. Then, the rotor 101 includes the rotor core 1 and a plurality of the magnets 2. Hereinafter, a case where the rotor 101 includes one rotor core 1 will be described as an example. The rotor may be configured by axially stacking a plurality of rotor core blocks having the same configuration as the rotor core described in the present embodiment.

As shown in FIG. 2, the rotor core 1 has a shaft insertion hole 1a extending along the center axis P. As shown in FIG. 1, the shaft 104 is fixed in a state of penetrating the shaft insertion hole 1a in the axial direction. Due to this, the rotor core 1 rotates together with the shaft 104.

The rotor core 1 has a columnar shape and includes a plurality of core plates 3 and a plurality of the magnet insertion holes 4. The plurality of core plates 3 are stacked in the thickness direction. The magnet insertion hole 4 extends in the axial direction. Each of the core plates 3 is a disk-shaped electromagnetic steel plate formed in a predetermined shape.

The plurality of magnet insertion holes 4 are located at predetermined intervals in the circumferential direction. The plurality of magnet insertion holes 4 penetrate the rotor core 1 in the axial direction. The plurality of magnet insertion holes 4 have a rectangular elongated in one direction as viewed from the axial direction. The plurality of magnet insertion holes 4 include a magnet insertion hole 4 whose long direction is along the outer periphery of the rotor core 1 as viewed from the axial direction, and a magnet insertion hole 4 extending from the radially outer peripheral side to the radially inner peripheral side of the rotor core 1 as viewed from the axial direction. The magnet 2 is accommodated in the magnet insertion hole 4. The plurality of magnet insertion holes 4 may include the magnet insertion hole 4 extending in the radial direction of the rotor core 1 as viewed from the axial direction.

The magnet 2 has a cuboid shape and extends in the axial direction. The magnet 2 is accommodated in the magnet insertion hole 4. Specifically, the magnet 2 is inserted in the magnet insertion direction, which is a direction in which the magnet 2 is inserted from one side in the axial direction of the rotor 101, and is accommodated in the magnet insertion hole 4. The magnet 2 is fixed to the magnet insertion hole 4 by a protrusion portion 52 of a holding core plate 5 described later.

In the present embodiment, the magnet 2 has a front side edge portion 21 and a magnet-side chamfered portion 22. The front side edge portion 21 and the magnet-side chamfered portion 22 will be described later.

Figure 3:
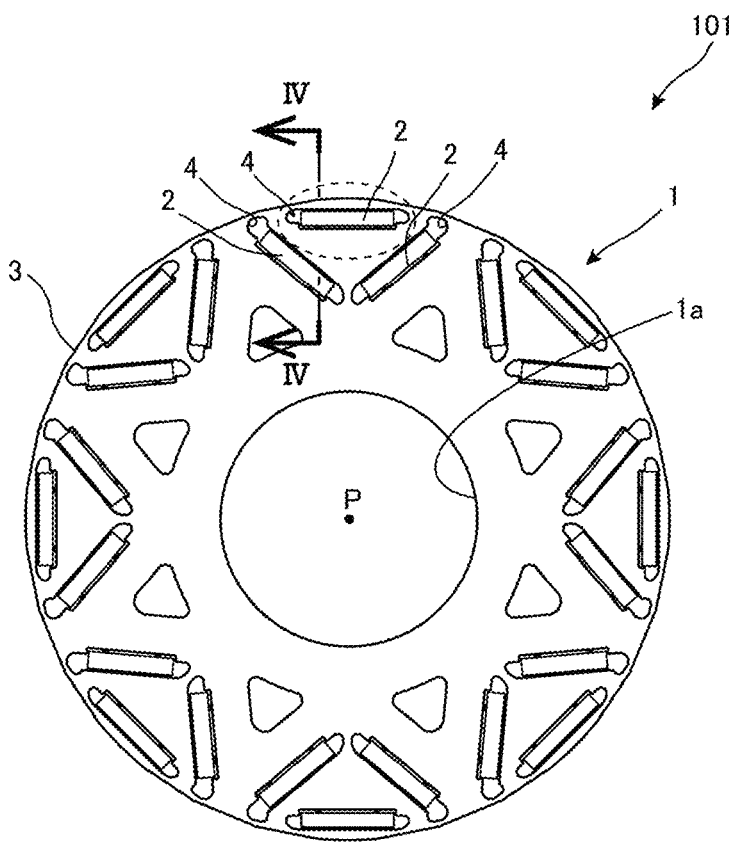
FIG. 3 is a view of a rotor as viewed from an axial direction.
Figure 4:
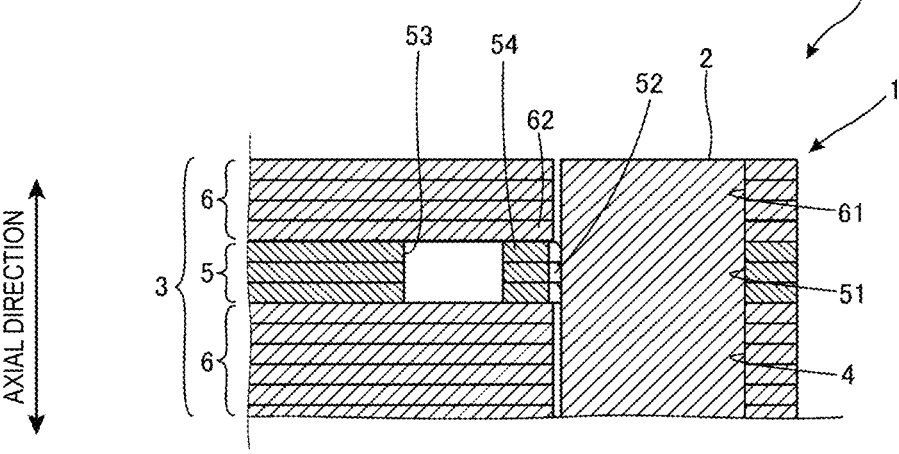
FIG. 4 is a sectional view taken along line IV-IV of FIG. 3.

FIG. 3 is a view of the rotor 101 as viewed from the axial direction. FIG. 4 is a sectional view taken along line IV-IV in FIG. 3. As shown in FIG. 4, the plurality of stacked core plates 3 include the holding core plate 5 and a basic core plate 6. In the present embodiment, the plurality of holding core plates 5 are continuously stacked.

The plurality of basic core plates 6 are stacked adjacent to the plurality of holding core plates 5. As shown in FIG. 4, the plurality of basic core plates 6 are stacked on one side and the other side in the axial direction with respect to the plurality of holding core plates 5.

Figure 5:
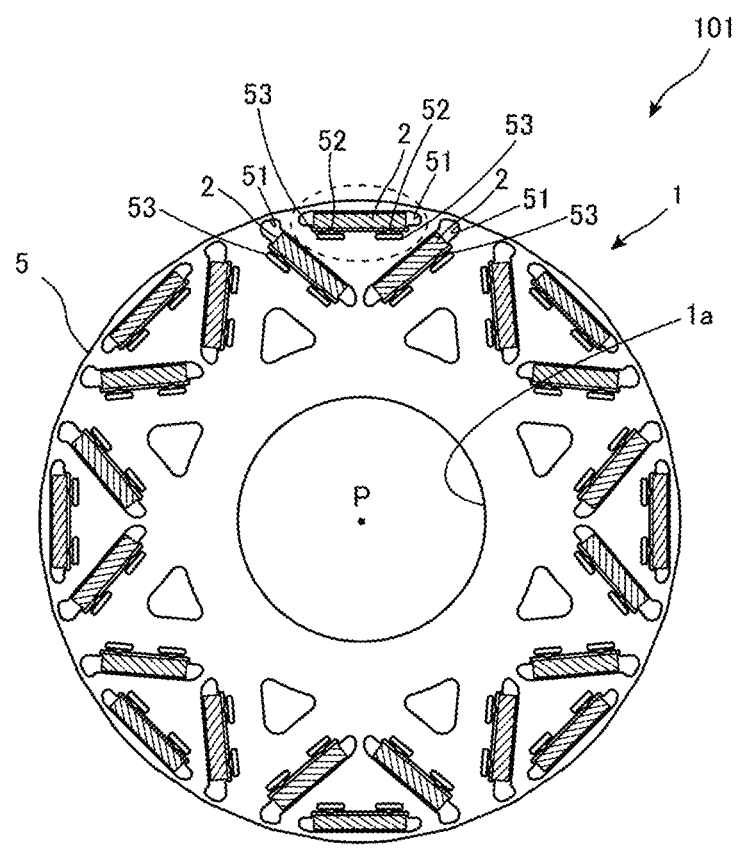
FIG. 5 is a view of a holding core plate according to the first embodiment as viewed from the axial direction.
Figure 6:
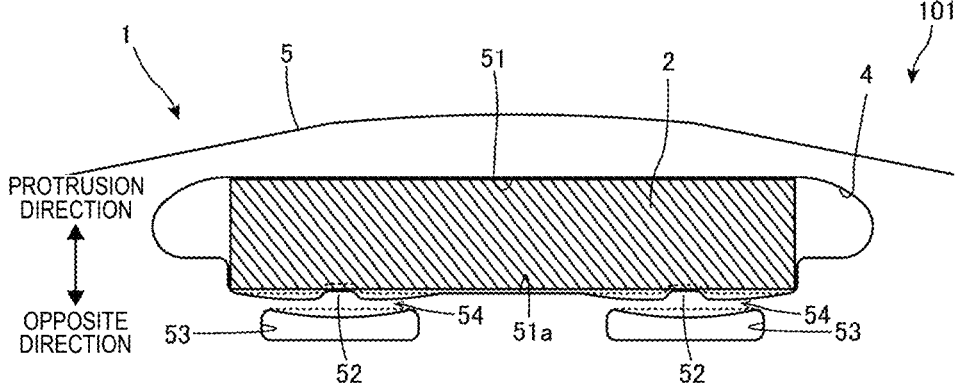
FIG. 6 is a partially enlarged view of a magnet insertion hole and a displacement permission portion of the holding core plate.

An example of the holding core plate 5 according to the first embodiment will be described with reference to FIGS. 5 to 7. As shown in FIGS. 5 and 6, the holding core plate 5 includes a plurality of insertion through holes 51, a plurality of protrusion portions 52, a plurality of displacement permission portions 53, and a plurality of deformation portions 54. FIG. 5 shows the holding core plate 5 as viewed from the axial direction. FIG. 6 is an enlarged view of the insertion through hole 51 and the displacement permission portion 53 of the holding core plate 5.

In the present embodiment, as shown in FIG. 5, the holding core plate 5 includes two protrusion portions 52 and two displacement permission portions 53 on the radially inner side of one insertion through hole 51. As shown in FIG. 6, the holding core plate 5 includes two deformation portions 54 on the radially inner side of the one insertion through hole 51. In the plurality of insertion through holes 51 in the same holding core plate 5, the configurations of the two protrusion portions 52, the two displacement permission portions 53, and the two deformation portions 54 with respect to the respective insertion through hole 51 are the same. The configurations of the plurality of insertion through holes 51 are the same. Therefore, the one insertion through hole 51, and the protrusion portion 52, the displacement permission portion 53, and the deformation portion 54 located with respect to the insertion through hole 51 will be described below.

The insertion through hole 51 penetrates the holding core plate 5 in the thickness direction. The insertion through hole 51 constitutes a part of the magnet insertion hole 4. The magnet 2 is located in the insertion through hole 51. As shown in FIG. 6, the insertion through hole 51 has a shape elongated in one direction as the holding core plate 5 is viewed from the axial direction. In the example shown in FIG. 6, the insertion through hole 51 has a shape elongated in one direction orthogonal to the radial direction as the holding core plate 5 is viewed from the axial direction.

The protrusion portion 52 protrudes from an inner surface 51a of the insertion through hole 51 toward the inside of the magnet insertion hole 4 and is in contact with the magnet 2. The protrusion portion 52 has a trapezoidal shape as the holding core plate 5 is viewed from the axial direction. The two protrusion portions 52 are located side by side on the inner surface on the radially inner side of the inner surface extending in the long direction of the insertion through hole 51.

In the present embodiment, the protrusion portion 52 includes a tip end edge portion 55 and a protrusion portion-side chamfered portion 56. The tip end edge portion 55 and the protrusion portion-side chamfered portion 56 will be described later.

The displacement permission portion 53 is a through hole penetrating the holding core plate 5 in the thickness direction. The displacement permission portion 53 is located in the opposite direction to the protrusion direction of the protrusion portion 52 with respect to the protrusion portion 52. In the example shown in FIG. 6, the displacement permission portion 53 is located on the radially inner side with respect to the insertion through hole 51. The displacement permission portion 53 has a rectangular shape as the holding core plate 5 is viewed from the axial direction. In the example of FIG. 6, the displacement permission portion 53 has a shape elongated in a direction orthogonal to the protrusion direction.

The deformation portion 54 is located between the protrusion portion 52 and the displacement permission portion 53. Specifically, the deformation portion 54 is a part of the holding core plate 5 located between the displacement permission portion 53 and the base end portion of the protrusion portion 52.

Figure 7:
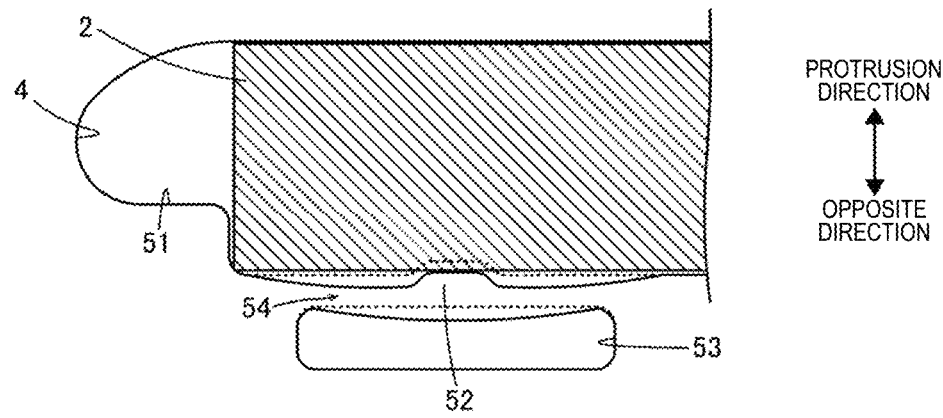
FIG. 7 is a partially enlarged view of a protrusion portion.

Broken lines in FIGS. 6 and 7 indicate examples of shapes of the protrusion portion 52, the displacement permission portion 53, and the deformation portion 54 when the magnet 2 is not inserted into the magnet insertion hole 4. FIG. 7 is an enlarged view of the protrusion portion 52.

As indicated by broken lines in FIGS. 6 and 7, when the magnet 2 is not inserted into the magnet insertion hole 4 as viewed in the axial direction, the tip end portion of the protrusion portion 52 protrudes to the region in which magnet 2 is accommodated in the magnet insertion hole 4. Therefore, when the magnet 2 is inserted into the magnet insertion hole 4, the protrusion portion 52 is pushed in the opposite direction by the magnet 2. In the opposite direction, the displacement permission portion 53, which is a space, is located. When the protrusion portion 52 is pushed in the opposite direction, the deformation portion 54 located between the protrusion portion 52 and the displacement permission portion 53 is deformed in the opposite direction as indicated by broken lines in FIGS. 6 and 7. Due to this, the protrusion portion 52 is displaced in the opposite direction together with the deformation portion 54. That is, the displacement permission portion 53 permits displacement of the protrusion portion 52 in the opposite direction. Therefore, in a state where the magnet 2 is inserted into the magnet insertion hole 4, the protrusion portion 52 pushes the magnet 2 in the protrusion direction by the elastic restoring force of the deformation portion 54.

As described above, in the present embodiment, the plurality of holding core plates 5 are continuously stacked. As shown in FIG. 4, the insertion through holes 51 of the plurality of holding core plates 5 overlap one another as viewed from the axial direction. The plurality of displacement permission portions 53 overlap one another as viewed from the axial direction. The plurality of protrusion portions 52 overlap one another as viewed from the axial direction. The plurality of deformation portions 54 overlap one another as viewed from the axial direction.

Figure 8:
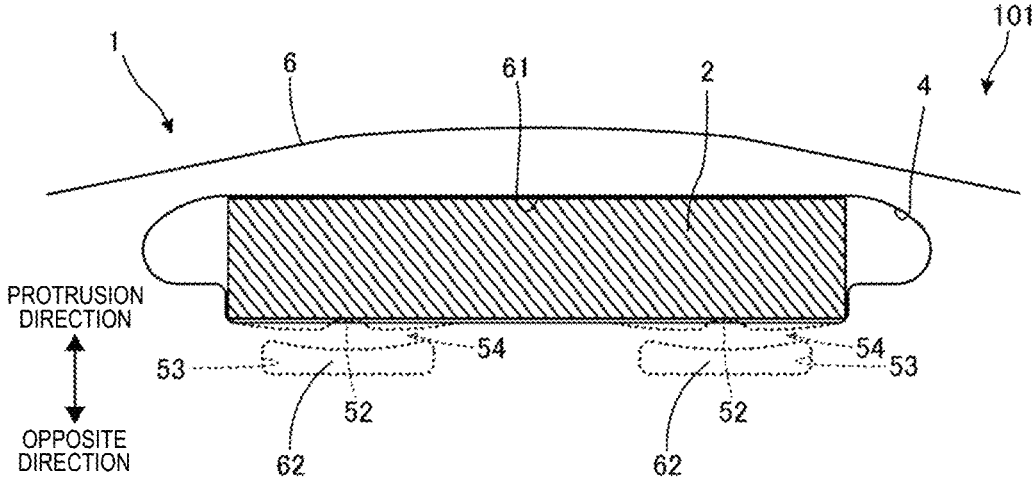
FIG. 8 is a partially enlarged view of a basic core plate according to the first embodiment.
Figure 9:
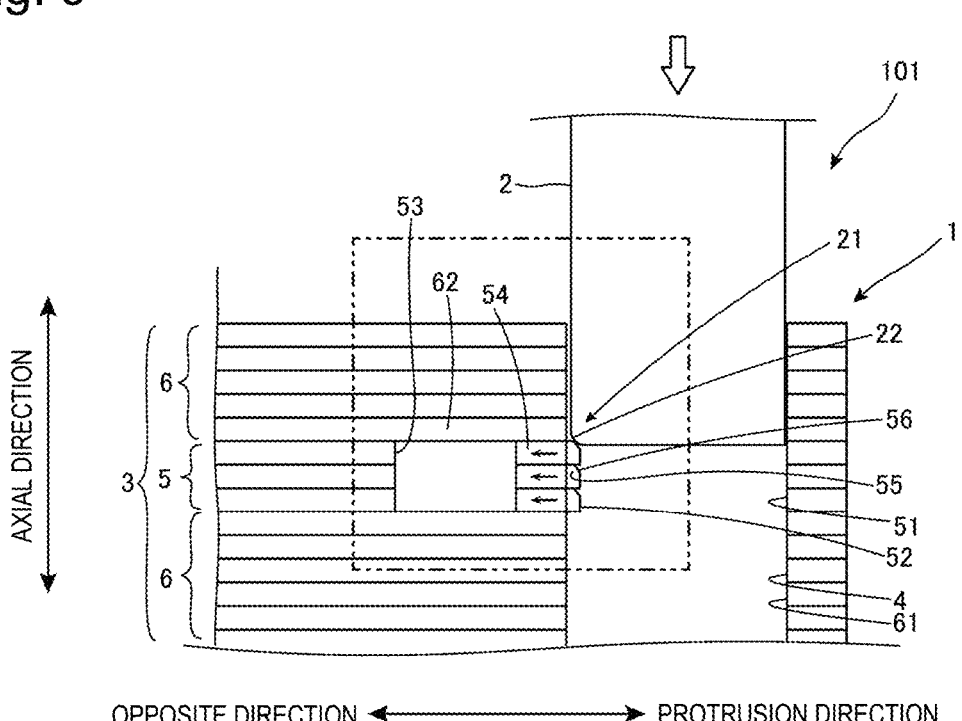
FIG. 9 is a view for explaining a chamfered portion in the rotor according to the first embodiment.

An example of the basic core plate 6 according to the first embodiment will be described with reference to FIGS. 4 and 8. FIG. 8 is a view of the rotor core 1 as viewed from the axial direction, and shows the basic core plate 6 located at the end portion of the rotor core 1 in the axial direction. The plurality of basic core plates 6 each have the same configuration. Therefore, description of components other than the basic core plate 6 located at the end portion in the axial direction of the rotor core 1 will be omitted.

As shown in FIG. 8, the basic core plate 6 includes a magnet through hole 61 and a covering portion 62. The magnet through hole 61 constitutes a part of the magnet insertion hole 4. The magnet 2 is located in the magnet through hole 61. As shown in FIG. 8, the magnet through hole 61 has a shape elongated in one direction as the holding core plate 5 is viewed from the axial direction. In the example shown in FIG. 8, the insertion through hole 51 has a shape elongated in one direction orthogonal to the radial direction as the holding core plate 5 is viewed from the axial direction. The magnet through hole 61 is located in a position overlapping the insertion through hole 51 of the holding core plate 5 as the rotor core 1 is viewed from the axial direction.

The covering portion 62 is located in a position overlapping the protrusion portion 52, the displacement permission portion 53, and the deformation portion 54 of the holding core plate 5 as the rotor core 1 is viewed from the axial direction. That is, the protrusion portion 52, the displacement permission portion 53, and the deformation portion 54 of the holding core plate 5 stacked adjacent to one side and the other side in the axial direction with respect to the basic core plate 6 are covered in the axial direction by the covering portion 62 of the basic core plate 6. The basic core plate 6 needs not include the covering portion 62.

As described above, in the present embodiment, the plurality of basic core plates 6 are continuously stacked. As shown in FIG. 4, the plurality of magnet through holes 61 are arranged side by side in the axial direction. As shown in FIG. 4, the plurality of covering portions 62 are arranged side by side in the axial direction.

Figure 10:
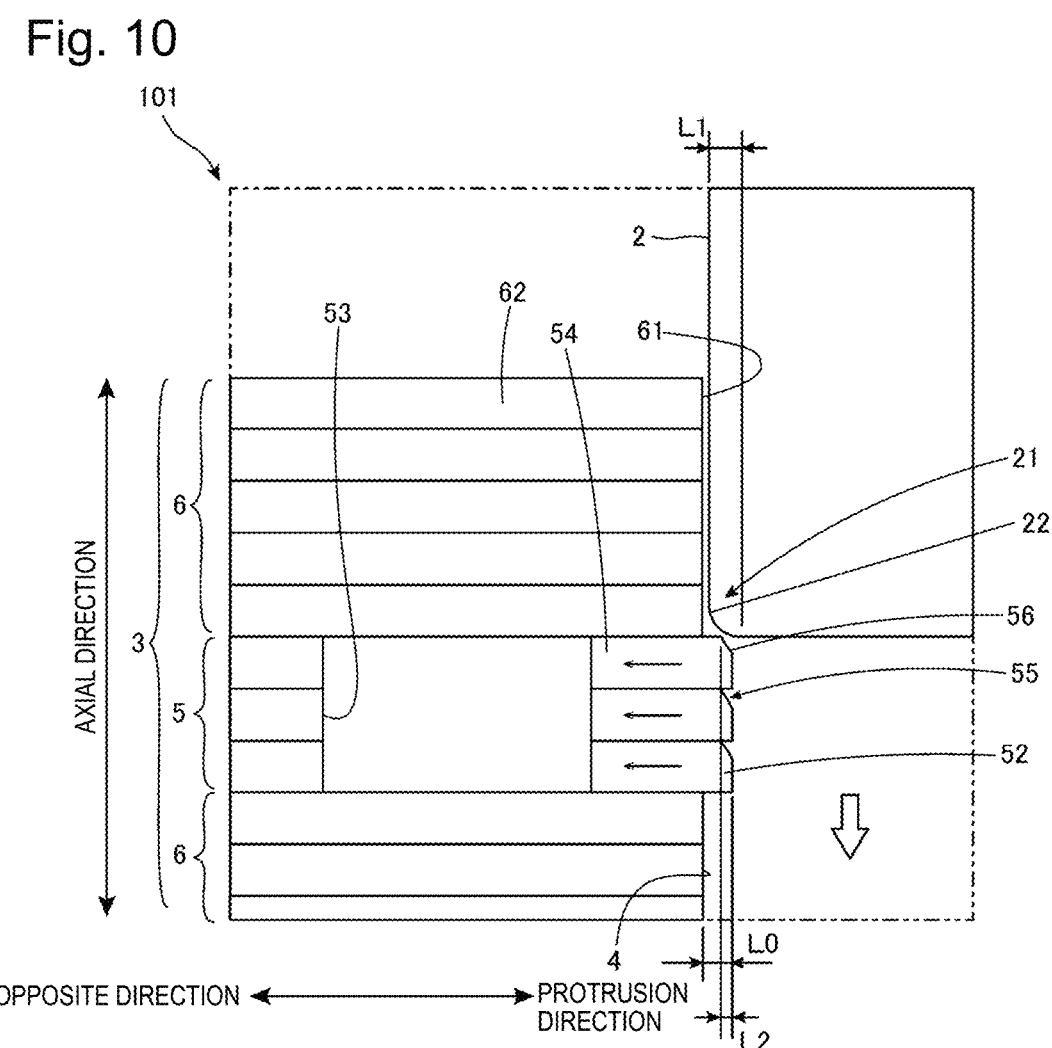
FIG. 10 is an enlarged view of the chamfered portion.
Figure 11:
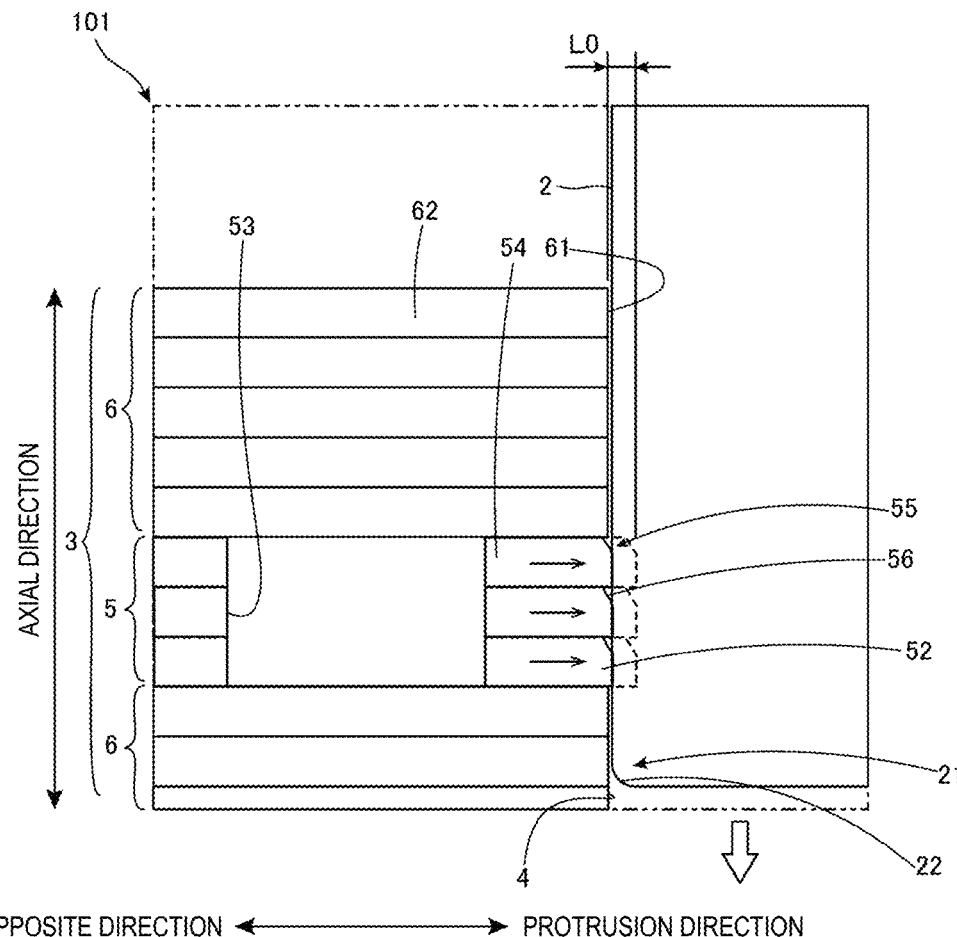
FIG. 11 is an enlarged view of the chamfered portion.

An example of the chamfered portion of the rotor 101 according to the first embodiment will be described with reference to FIGS. 4, 9, 10, and 11. FIGS. 10 and 11 are enlarged views of the chamfered portion with a part surrounded by the two-dot chain line in FIG. 9 enlarged.

The magnet 2 includes the front side edge portion 21 on the front side in the magnet insertion direction and on the protrusion portion 52 side in the protrusion direction. The protrusion portion 52 of the holding core plate 5 includes the tip end edge portion 55 rearward in the magnet insertion direction at the tip end portion thereof. In the present embodiment, the front side edge portion 21 and the tip end edge portion 55 extend in a direction orthogonal to both the protrusion direction and the magnet insertion direction.

The magnet 2 includes the magnet-side chamfered portion 22 in which the front side edge portion 21 is chamfered. The protrusion portion 52 includes the protrusion portion-side chamfered portion 56 in which the tip end edge portion 55 of the protrusion portion 52 is chamfered. Thus, the rotor 101 of the first embodiment includes the magnet-side chamfered portion 22 and the protrusion portion-side chamfered portion 56.

The sum of a length L1 of the magnet-side chamfered portion 22 and a length L2 of the protrusion portion-side chamfered portion 56 is equal to or longer than a length L0 of the protrusion portion 52 in the protrusion direction of the protrusion portion 52 as the rotor 101 is viewed from the axial direction.

In the rotor 101 shown in FIG. 10, in the protrusion direction of the protrusion portion 52, the sum of the length L1 of the magnet-side chamfered portion 22 and the length L2 of the protrusion portion-side chamfered portion 56 is longer than the length L0 of the protrusion portion 52 and is shorter than twice the length L0 of the protrusion portion 52. The sum of the lengths may be longer than twice the length L0 of the protrusion portion 52.

Specifically, the magnet-side chamfered portion 22 is a part in which the front side edge portion 21 is chamfered along the long direction of the front side edge portion 21. In the present embodiment, the front side edge portion 21 of the magnet 2 is rounded. That is, the magnet-side chamfered portion 22 has a curved surface as viewed from a direction orthogonal to both the protrusion direction and the magnet insertion direction. For example, the magnet-side chamfered portion 22 is an R surface located at the front side edge portion 21 of the magnet 2.

On the other hand, as shown in FIGS. 10 and 11, the protrusion portion-side chamfered portion 56 is a surface inclined with respect to the thickness direction of the core plate 3 as viewed from a direction orthogonal to the protrusion direction and the magnet insertion direction.

In the present embodiment, the protrusion portion-side chamfered portion 56 is a shear droop surface 5a. That is, the end surface of the protrusion portion 52 includes the shear droop surface 5a connected to a flat surface rearward in the magnet insertion direction of the protrusion portion 52.

Figure 12:
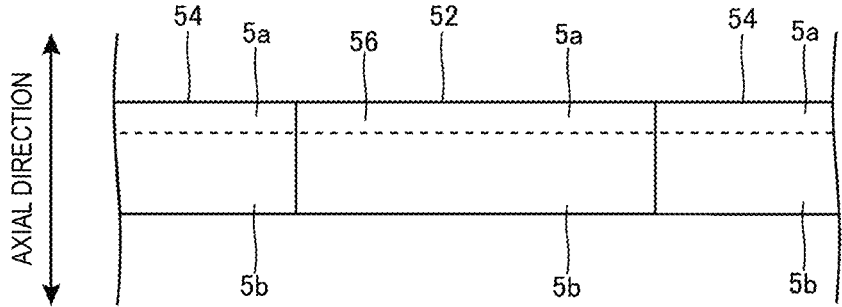
FIG. 12 is a view showing an example of an end surface of the protrusion portion of the holding core plate.
Figure 13:
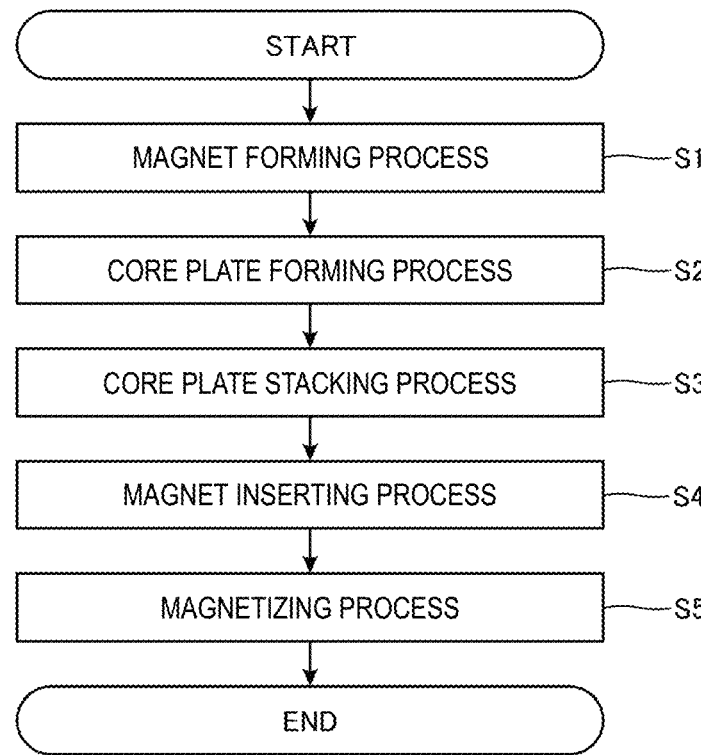
FIG. 13 is a view showing an example of the manufacturing method of the rotor according to the first embodiment.

Here, an example of the end surface of the protrusion portion 52 including the shear droop surface 5a will be described with reference to FIG. 12. FIG. 12 is a view of the protrusion portion 52 and the deformation portion 54 of the holding core plate 5 as viewed in the protrusion direction. The core plate 3 of the present embodiment is formed by punching an electromagnetic steel plate using a punch and a die that are not shown. As shown in FIG. 12, for example, the end surface of the tip end portion of the protrusion portion 52 includes the shear droop surface 5a and a shear surface 5b arranged side by side in the thickness direction. The shear droop surface 5a is a part of the electromagnetic steel plate that is pulled by a punch not shown during punching. The shear surface 5b is a surface sheared by the punch stuck in the electromagnetic steel plate.

As described above, the exemplary rotor 101 according to the present embodiment includes the rotor core 1 in a columnar shape having the plurality of core plates 3 stacked in the thickness direction and the magnet insertion hole 4 extending in the axial direction, and the magnet 2 inserted into the magnet insertion hole 4. The plurality of core plates 3 include the holding core plate 5 including the insertion through hole 51 constituting a part of the magnet insertion hole 4, the protrusion portion 52 protruding from the inner surface of the insertion through hole 51 toward the inside of the magnet insertion hole 4 and in contact with the magnet 2, and the displacement permission portion 53 located in an opposite direction to the protrusion direction of the protrusion portion 52 with respect to the protrusion portion 52 and permitting displacement of the protrusion portion 52 in the opposite direction. The magnet 2 includes the front side edge portion 21 on the front side in the magnet insertion direction, which is the direction in which the magnet 2 is inserted into the magnet insertion hole 4, and on the protrusion portion 52 side in the protrusion direction. The protrusion portion 52 includes the tip end edge portion 55 rearward in the magnet insertion direction at the tip end portion thereof. The rotor 101 includes at least one of the magnet-side chamfered portion 22 in which the front side edge portion 21 of the magnet 2 is chamfered and the protrusion portion-side chamfered portion 56 in which the tip end edge portion 55 of the protrusion portion 52 is chamfered. The sum of the length L1 of the magnet-side chamfered portion 22 and the length L2 of the protrusion portion-side chamfered portion 56 is equal to or longer than the length of the protrusion portion 52 in the protrusion direction of the protrusion portion 52 as the rotor 101 is viewed from the axial direction.

According to this configuration, the magnet 2 can be held by the protrusion portion 52 of the holding core plate 5 protruding to the region in which the magnet 2 is accommodated in the magnet insertion hole 4. Therefore, the manufacturing process of the rotor 101 does not need to have a process for holding the magnet 2 separately from the process for inserting the magnet 2 into the magnet insertion hole 4.

When the magnet 2 is inserted into the magnet insertion hole 4 of the rotor core 1, the magnet-side chamfered portion 22 where the front side edge portion 21 of the magnet 2 is chamfered and the protrusion portion-side chamfered portion 56 where the tip end edge portion 55 of the protrusion portion 52 is chamfered come into contact with each other. When the magnet 2 comes into contact with the protrusion portion 52, the magnet-side chamfered portion 22 and the protrusion portion-side chamfered portion 56 divide a force applied from the magnet 2 to the protrusion portion 52 into a force for pushing in the magnet insertion direction and a force for pushing in the opposite direction.

This reduces the force by which the magnet 2 comes into contact with the protrusion portion and pushes the protrusion portion 52 in the magnet insertion direction when the magnet 2 is inserted into the magnet insertion hole 4. Therefore, it is possible to suppress plastic deformation of the tip end portion of the protrusion portion 52 to a state of being bent in the magnet insertion direction. Therefore, in the rotor 101 that holds, by the protrusion portion 52, the magnet 2 inserted into the magnet insertion hole 4, it is possible to achieve a configuration that can appropriately hold the magnet 2.

An example of the manufacturing method of the rotor 101 according to the first embodiment will be described with reference to FIGS. 9 to 11 and FIG. 13. The manufacturing method of the rotor 101 includes a magnet forming process S1, a core plate forming process S2, a core plate stacking process S3, a magnet inserting process S4, and a magnetizing process S5.

The magnet forming process S1 is a process of forming the magnet 2 to be inserted into the magnet insertion hole 4 of the rotor core 1. First, in the magnet forming process S1, the magnet 2 having a cuboid shape is formed. For example, the magnet 2 having a cuboid shape is formed by cutting a sintered body obtained by sintering a magnetic body.

Furthermore, the magnet forming process S1 includes the magnet-side chamfered portion forming process of forming the magnet-side chamfered portion 22 in the magnet 2 by chamfering the front side edge portion 21 of the magnet 2 located on the front side in the magnet insertion direction and on the protrusion portion 52 side in the protrusion direction. In the magnet-side chamfered portion forming process, the magnet-side chamfered portion 22 is formed in the magnet 2 using a chamfering tool not shown.

Specifically, by the magnet-side chamfered portion forming process, edge portions of all sides of the magnet 2 extending in a direction orthogonal to both the protrusion direction and the magnet insertion direction are chamfered on both end surfaces in the magnet insertion direction. This can bring the chamfered part of the magnet 2 into contact with the edge portion of the protrusion portion 52 regardless of the orientation of the magnet 2 when the magnet 2 is inserted into the magnet insertion hole 4 of the rotor 101. Therefore, when the magnet 2 is inserted into the magnet insertion hole 4 of the rotor 101, it is not necessary to adjust the orientation of the magnet 2.

In the magnet-side chamfered portion forming process, the magnet 2 may have the magnet-side chamfered portion 22 in only one side constituting the front side edge portion 21 of the sides of the cuboid. That is, in the magnet-side chamfered portion forming process, only one edge portion among edge portions of sides parallel to the long direction of the front side edge portion 21 may be chamfered on both end surfaces of the magnet 2 in the magnet insertion direction. By limiting the number of sides to be chamfered to one, the number of chamfered portions of the magnet 2 is minimized. This suppresses a decrease in the volume of the magnet 2. Therefore, it is possible to suppress deterioration in the magnetic characteristics of the rotor 101.

As described above, in the magnet forming process S1, the front side edge portion 21 of the magnet 2 located on the front side in the magnet insertion direction, which is the insertion direction of the magnet 2 with respect to the magnet insertion hole 4, and on the protrusion portion 52 side in the protrusion direction is chamfered. That is, the magnet forming process S1 includes the magnet-side chamfered portion forming process of forming the magnet-side chamfered portion 22.

The core plate forming process S2 is a process of forming the holding core plate 5 and the basic core plate 6. By the core plate forming process S2, the holding core plate 5 is formed, including the plurality of insertion through holes 51 constituting a part of the magnet insertion hole 4, the protrusion portion 52 protruding from the inner surface of the insertion through hole 51 toward the inside of the magnet insertion hole 4 and in contact with the magnet 2, and the displacement permission portion 53 located in an opposite direction to the protrusion direction of the protrusion portion 52 with respect to the protrusion portion 52 and permitting displacement of the protrusion portion 52 in the opposite direction.

In the core plate forming process S2, the shear droop surface 5a, which is the protrusion portion-side chamfered portion 56, is formed by punching a steel plate. Thus, the protrusion portion-side chamfered portion 56 is formed simultaneously with the formation of the holding core plate 5. That is, the core plate forming process S2 includes the protrusion portion-side chamfered portion forming process of forming the protrusion portion-side chamfered portion 56 in the tip end edge portion 55 rearward in the magnet insertion direction at the tip end portion of the protrusion portion 52.

Furthermore, the basic core plate 6 including the magnet through hole 61 and the covering portion 62 is formed by the core plate forming process S2.

By the magnet forming process S1 and the core plate forming process S2, the rotor 101 is manufactured, in which the sum of a length L1 of the magnet-side chamfered portion 22 and a length L2 of the protrusion portion-side chamfered portion 56 is equal to or longer than a length L0 of the protrusion portion 52 in the protrusion direction of the protrusion portion 52 as the rotor 101 is viewed from the axial direction.

The core plate stacking process S3 is a process of stacking the holding core plate 5 and the basic core plate 6 in a predetermined order in the thickness direction. Specifically, the plurality of holding core plates 5 are continuously stacked, and the plurality of basic core plates 6 are stacked on one side and the other side in the axial direction with respect to the plurality of holding core plates 5. Thus, by stacking the plurality of core plates 3 in the thickness direction, the rotor core 1 in a columnar shape having the magnet insertion hole 4 extending in the axial direction is obtained. In the magnet insertion hole 4 of the rotor core 1, the protrusion portion 52 protrudes toward the inside of the magnet insertion hole 4. Specifically, the tip end portion of the protrusion portion 52 protrudes to the region in which the magnet 2 is accommodated in the magnet insertion hole 4 as the rotor core 1 is viewed from the axial direction.

The magnet inserting process S4 is a process of inserting the magnet 2 into the magnet insertion hole 4 while bringing the magnet 2 into contact with the protrusion portion 52. An example of the magnet inserting process S4 will be described with reference to FIGS. 10 and 11. As shown in FIG. 10, in a state where the magnet 2 is not inserted into the magnet insertion hole 4, the protrusion portion 52 protrudes to the region in which the magnet 2 is accommodated in the magnet insertion hole 4.

When the magnet 2 is inserted into the magnet insertion hole 4, the magnet-side chamfered portion 22 where the front side edge portion 21 of the magnet 2 is chamfered and the protrusion portion-side chamfered portion 56 where the tip end edge portion 55 of the protrusion portion 52 is chamfered come into contact with each other. When the magnet 2 comes into contact with the protrusion portion 52, the magnet-side chamfered portion 22 and the protrusion portion-side chamfered portion 56 divide a force applied from the magnet 2 to the protrusion portion 52 into a force for pushing in the magnet insertion direction and a force for pushing in the opposite direction.

This reduces the force by which the magnet 2 comes into contact with the protrusion portion and pushes the protrusion portion 52 in the magnet insertion direction when the magnet 2 is inserted into the magnet insertion hole 4. Therefore, it is possible to suppress plastic deformation of the tip end portion of the protrusion portion 52 to a state of being bent in the magnet insertion direction. Therefore, in the rotor 101 that holds, by the protrusion portion 52, the magnet 2 inserted into the magnet insertion hole 4, a configuration that can appropriately hold the magnet 2 is achieved.

When the magnet 2 comes into contact with the protrusion portion 52, the force applied from the magnet 2 to the protrusion portion 52 is divided into the force for pushing in the magnet insertion direction and the force for pushing in the opposite direction, whereby the deformation portion 54 is deformed in the opposite direction, and the protrusion portion 52 is displaced in the opposite direction. Therefore, the magnet 2 can be smoothly inserted into the magnet insertion hole 4.

On the other hand, the deformation portion 54 has an elastic restoring force. As shown in FIG. 11, due to the elastic restoring force, the protrusion portion 52 in contact with the magnet 2 pushes the magnet 2 in the protrusion direction of the protrusion portion 52. Due to this, the magnet 2 inserted into the magnet insertion hole 4 is pressed against the inner surface of the magnet insertion hole 4 on the opposite side to the deformation portion 54. As a result, the magnet 2 is held in the magnet insertion hole 4.

Here, the magnet-side chamfered portion 22 has a curved surface as viewed from a direction orthogonal to the protrusion direction and the magnet insertion direction. Due to this, when the magnet 2 comes into contact with the protrusion portion 52, the force applied from the magnet 2 to the protrusion portion 52 is divided into the force for pushing the magnet insertion direction and the force for pushing the protrusion portion 52 in an opposite direction to the protrusion direction. Therefore, it is possible to suppress bending of the tip end portion of the protrusion portion 52 in the magnet insertion direction.

When the steel plate is punched, the shear droop surface 5a may be formed on an end surface oppose of the steel plate. In the present embodiment, the end surface of the protrusion portion 52 includes the shear droop surface 5a connected to a flat surface rearward in the magnet insertion direction of the protrusion portion 52. The protrusion portion-side chamfered portion 56 is the shear droop surface 5a. Due to this, when the protrusion portion 52 is formed by punching the steel plate, the shear droop surface 5a formed on the tip end surface of the protrusion portion 52 can be used as the protrusion portion-side chamfered portion 56.

That is, by punching out the holding core plate 5 from the steel plate and stacking the holding core plate 5, the shear droop surface 5a can be used as the protrusion portion-side chamfered portion 56 without performing special processing for forming the protrusion portion-side chamfered portion 56 on the holding core plate 5.

In this manner, by using the shear droop surface 5a formed when the steel plate is punched as the protrusion portion-side chamfered portion 56, the processing process of the protrusion portion-side chamfered portion 56 becomes unnecessary. This can suppress the magnet 2 to be inserted into the magnet insertion hole 4 from being damaged by the protrusion portion 52 of the rotor core 1 while improving the productivity of the rotor 101.

After the magnet inserting process S4, the magnetizing process S5 is executed. The magnetizing process S5 is a process of magnetizing the magnet 2 inserted into the magnet insertion hole 4. Due to this, the rotor 101 is manufactured.

As described above, the manufacturing method of the exemplary rotor 101 according to the present embodiment is a manufacturing method of the rotor 101 including the rotor core 1 in a columnar shape having the plurality of core plates 3 stacked in the thickness direction and the magnet insertion hole 4 extending in the axial direction, and the magnet 2 inserted into the magnet insertion hole 4. This manufacturing method includes: the magnet forming process S1 of forming the magnet 2 to be inserted into the magnet insertion hole 4; the core plate forming process S2 of forming the plurality of core plates 3 including the holding core plate 5 having the insertion through hole 51 constituting a part of the magnet insertion hole 4, the protrusion portion 52 protruding from the inner surface 51a of the insertion through hole 51 inward of the magnet insertion hole 4 and in contact with the magnet 2, and the displacement permission portion 53 located in an opposite direction to the protrusion direction of the protrusion portion 52 with respect to the protrusion portion 52 and permitting displacement of the protrusion portion 52 in the opposite direction; the core plate stacking process S3 of stacking the plurality of core plates 3 in the thickness direction to obtain the rotor core 1 having the magnet insertion hole 4 in a columnar shape extending in the axial direction; and the magnet inserting process S4 of inserting the magnet 2 into the magnet insertion hole 4 of the rotor core 1 while bringing the magnet 2 into contact with the protrusion portion 52.

The manufacturing method of the rotor 101 further includes at least one of a magnet-side chamfered portion forming process of forming the chamfered portion 22 in the magnet 2 by chamfering the front side edge portion 21 of the magnet 2 located on the front side in the magnet insertion direction, which is an insertion direction of the magnet 2 with respect to the magnet insertion hole 4, and on the protrusion portion 52 side in the protrusion direction, the magnet-side chamfered portion forming process being included in the magnet forming process S1, and the protrusion portion-side chamfered portion forming process of forming the chamfered portion 56 in the tip end edge portion 55 rearward in the magnet insertion direction at the tip end portion of the protrusion portion 52, the protrusion portion-side chamfered portion forming process being included in the core plate forming process S2. The sum of the length of the magnet-side chamfered portion 22 and the length of the protrusion portion-side chamfered portion 56 is equal to or longer than the length of the protrusion portion 52 in the protrusion direction of the protrusion portion 52 as the rotor 101 is viewed from the axial direction.

In this manufacturing method, the magnet 2 is held in the magnet insertion hole 4 by performing the magnet inserting process S4 of inserting the magnet 2 into the magnet insertion hole 4. That is, the manufacturing method of the rotor 101 does not need to have a process for holding the magnet 2 separately from the process of inserting the magnet 2 into the magnet insertion hole 4.

According to this manufacturing method, it is possible to suppress plastic deformation of the tip end portion of the protrusion portion 52 to a state of being bent in the magnet insertion direction. Therefore, in the rotor 101 that holds, by the protrusion portion 52, the magnet 2 inserted into the magnet insertion hole 4, a configuration that can appropriately hold the magnet 2 is achieved.

Next, an example of a rotor 101A according to the second embodiment will be described with reference to FIGS. 14 and 15. The rotor 101A of the second embodiment is different in that it has a scratch mark that is a mark of being brought into contact with the magnet 2 and the protrusion portion 52 in the magnet inserting process S4. However, the rotor 101 of the first embodiment and the rotor 101A of the second embodiment are the same in other configurations. Hereinafter, the same components as those of the first embodiment are denoted by the same reference signs, and the description thereof will be omitted.

In the magnet inserting process S4, when the magnet 2 is inserted, the protrusion portion 52 and the magnet 2 may be rubbed with each other, and a scratch mark 23 may be formed on the outer surface of the magnet 2 on the protrusion portion side. That is, the scratch mark 23 is a recess portion formed by the tip end portion of the protrusion portion 52 scraping the outer surface on the protrusion portion side of the magnet 2. Thus, in the magnet inserting process S4, the surface of the magnet 2 may be scraped.

Figure 14:
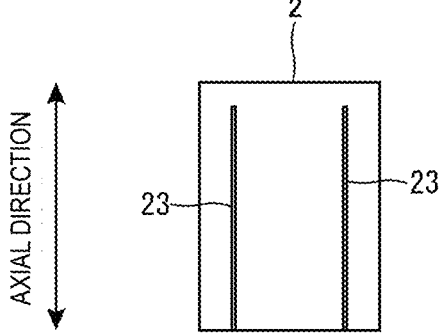
FIG. 14 is a view showing an example of a magnet in a rotor according to a second embodiment.
Figure 15:
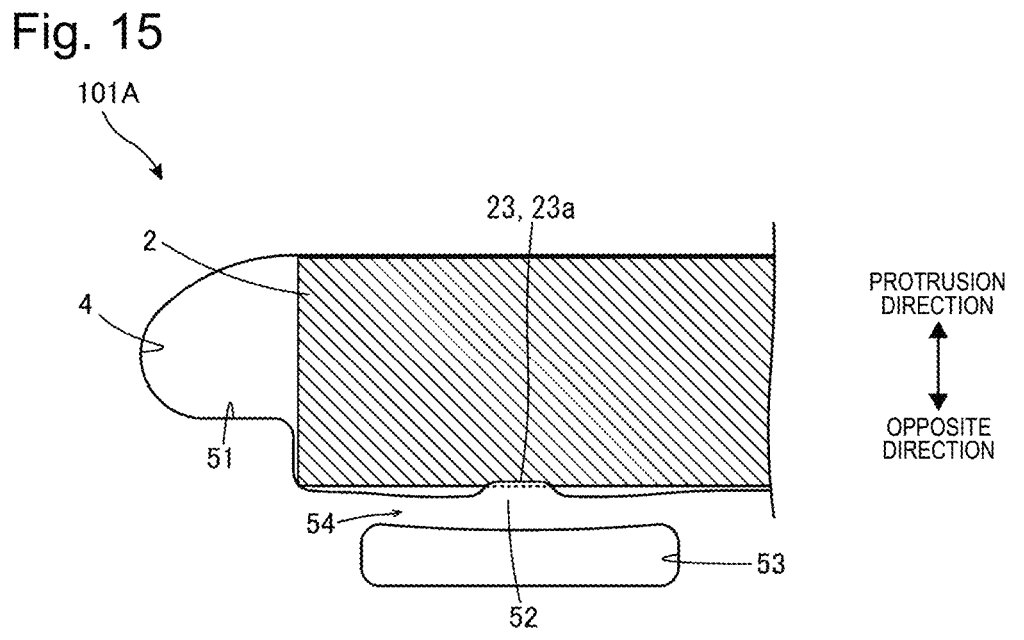

As shown in FIGS. 14 and 15, the magnet 2 according to the second embodiment has the scratch mark 23 with the protrusion portion 52 extending in the magnet insertion direction. As the magnet 2 is viewed from the axial direction, the tip end portion of the protrusion portion 52 is in contact with a part of the scratch mark 23.

FIG. 14 shows an example of the scratch mark 23 formed on the outer surface of the magnet 2 and the protrusion portion side. The scratch mark 23 extends in the axial direction, that is, in the magnet insertion direction.

FIG. 15 shows an example of a state in which the magnet 2 has the recess portion 23a due to the scratch mark 23, the tip end portion of the protrusion portion 52 is located inside the recess portion 23a, and the tip end portion of the protrusion portion 52 digs into the magnet 2. As shown in FIG. 15, the recess portion 23a is recessed in the protrusion direction. Broken line in FIG. 15 indicates the position of the outer surface of the magnet 2 when there is no scratch mark 23.

In this manner, since the protrusion portion 52 is located inside the recess portion 23a due to the scratch mark 23 and the tip end portion of the protrusion portion 52 digs into the magnet 2, the positional displacement of the magnet 2 in the magnet insertion hole 4 is suppressed.

Next, an example of a rotor 101B according to the third embodiment will be described with reference to FIG. 16. The rotor 101B of the third embodiment is different from the rotors 101 and 101A of the first and second embodiments in that the front side edge portion 21 of the magnet 2 has the magnet-side chamfered portion 22, but the tip end edge portion 55 of the protrusion portion 52 does not have the protrusion portion-side chamfered portion 56. However, the rotor 101, the rotor 101A, and the rotor 101B of the third embodiment are the same in other configurations. Hereinafter, the same components as those of the first and second embodiments are denoted by the same reference signs, and the description thereof will be omitted.

Figure 16:
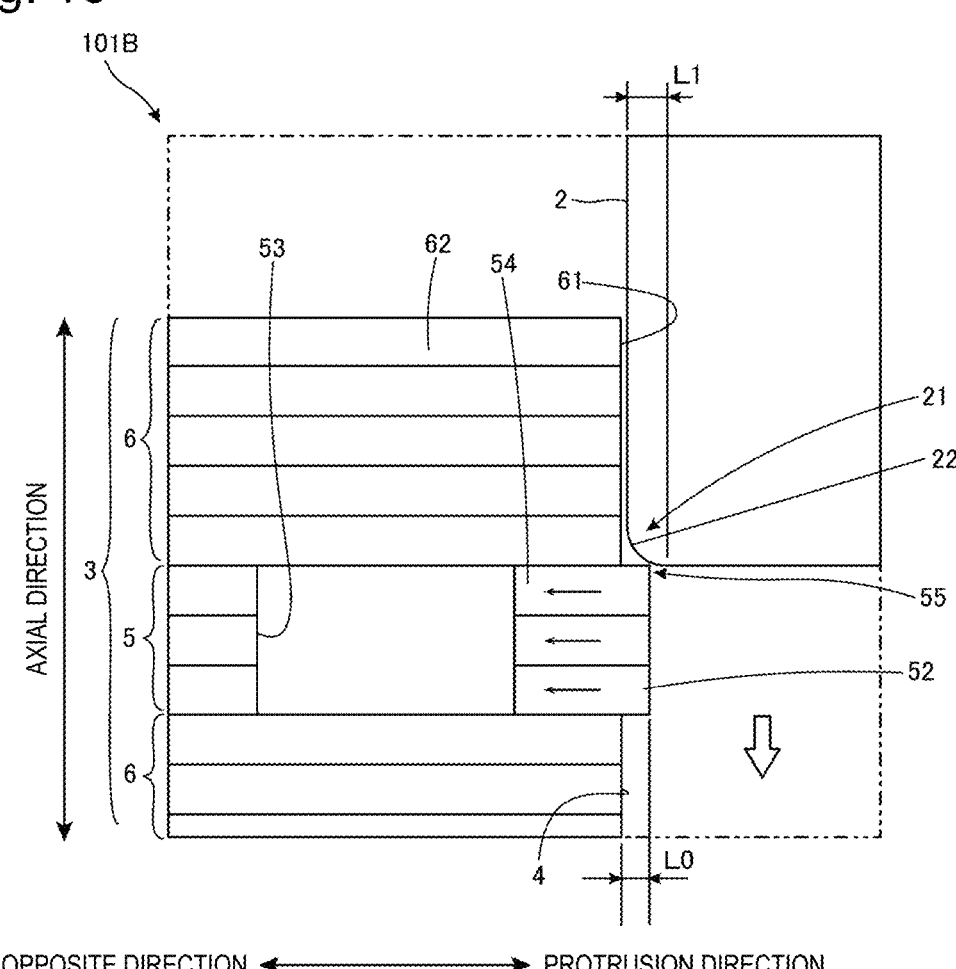
FIG. 16 is an enlarged view of a chamfered portion in a rotor according to a third embodiment.

FIG. 16 is a view showing an example of the rotor 101B according to the third embodiment. As shown in FIG. 16, the magnet 2 has the magnet-side chamfered portion 22 in which the front side edge portion 21 is chamfered. On the other hand, the tip end edge portion 55 of the protrusion portion 52 is not chamfered.

In the third embodiment, the length L1 of the magnet-side chamfered portion 22 is equal to or longer than a length L0 of the protrusion portion 52 in the protrusion direction as the rotor 101B is viewed from the axial direction.

According to this configuration, when only the magnet 2 of the magnet 2 and the protrusion portion 52 is chamfered, even if the magnet 2 is lean to a position close to the protrusion portion 52 when the magnet 2 is inserted into the magnet insertion hole 4, the entire protrusion portion 52 comes into contact with the magnet-side chamfered portion 22. Due to this, when the magnet 2 comes into contact with the protrusion portion 52, the force applied from the magnet 2 to the protrusion portion 52 is divided into the force for pushing the magnet insertion direction and the force for pushing the protrusion portion 52 in an opposite direction to the protrusion direction. Therefore, it is possible to reduce the force applied to the protrusion portion 52 in the magnet insertion direction when the magnet 2 is inserted into the magnet insertion hole 4.

The rotor 101B of the third embodiment can be manufactured by the same manufacturing method similarly to that of the first embodiment. However, when the rotor 101B of the third embodiment is manufactured, the core plate forming process S2 does not include the protrusion portion-side chamfered portion forming process. For example, the holding core plate 5 formed in the core plate forming process S2 needs not have the shear droop surface 5a connected to the flat surface rearward in the magnet insertion direction of the protrusion portion 52.

Next, an example of a rotor 101C according to the fourth embodiment will be described with reference to FIG. 17. The rotor 101C of the fourth embodiment is different from the rotors 101 and 101A of the first and second embodiments in that the protrusion portion 52 has the protrusion portion-side chamfered portion 56, but the magnet 2 does not have the magnet-side chamfered portion. The rotors 101 and 101A and the rotor 101C of the fourth embodiment are the same in other configurations. Hereinafter, the same components as those of the first embodiment are denoted by the same reference signs, and the description thereof will be omitted.

Figure 17:
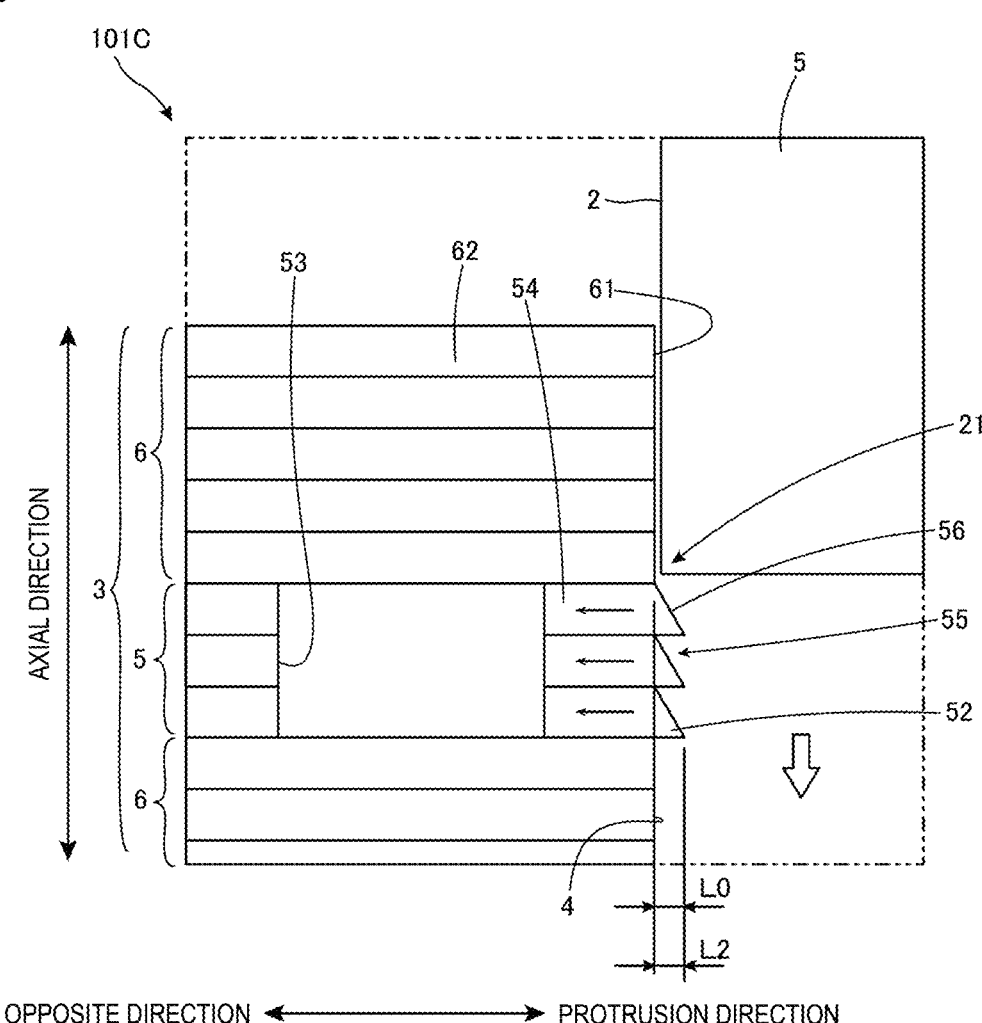
FIG. 17 is an enlarged view of a chamfered portion in a rotor according to a fourth embodiment.

FIG. 17 is a view showing an example of the rotor 101C according to the fourth embodiment. As shown in FIG. 17, the protrusion portion 52 of the holding core plate 5 has the protrusion portion-side chamfered portion 56 where the tip end edge portion 55 is chamfered. On the other hand, the front side edge portion 21 of the magnet 2 is not chamfered.

In the fourth embodiment, as the rotor 101C is viewed from the axial direction, the length L2 of the protrusion portion-side chamfered portion 56 is the same as the length L0 of the protrusion portion 52 in the protrusion direction.

According to this configuration, when only the protrusion portion 52 of the magnet 2 and the protrusion portion 52 is chamfered, even if the magnet 2 is lean to a position close to the protrusion portion 52 when the magnet 2 is inserted into the magnet insertion hole 4, the front side edge portion 21 of the magnet 2 comes into contact with the protrusion portion-side chamfered portion 56. Due to this, when the magnet 2 comes into contact with the protrusion portion 52, the force applied from the magnet 2 to the protrusion portion 52 is divided into the force for pushing the magnet insertion direction and the force for pushing the protrusion portion 52 in an opposite direction to the protrusion direction. Therefore, it is possible to reduce the force applied to the protrusion portion 52 in the magnet insertion direction when the magnet 2 is inserted into the magnet insertion hole 4.

The rotor 101C of the fourth embodiment can be manufactured by the same manufacturing method similarly to that of the first embodiment. However, in the manufacturing of the rotor 101C of the fourth embodiment, the magnet forming process S1 does not include the magnet-side chamfered portion forming process.

In the present embodiment, the shear droop surface 5a including the protrusion portion-side chamfered portion 56 having the same length as the length L0 of the protrusion portion 52 in the protrusion direction may be formed. Alternatively, in the protrusion portion-side chamfered portion forming process in the core plate forming process S2, by further processing the tip end edge portion 55 using a chamfering tool not shown with respect to the holding core plate 5 punched out from the steel plate, the protrusion portion-side chamfered portion 56 having the same length as the length L0 of the protrusion portion 52 in the protrusion direction may be formed.

As described above, the rotors 101, 101A, 101B, and 101C according to the first to fourth embodiments have the following features.

(1) The rotor according to the embodiment includes: a rotor core in a columnar shape having a plurality of core plates stacked in a thickness direction and a magnet insertion hole extending in an axial direction; and a magnet inserted into the magnet insertion hole. The plurality of core plates include a holding core plate having an insertion through hole constituting a part of the magnet insertion hole, a protrusion portion protruding from an inner surface of the insertion through hole toward an inside of the magnet insertion hole and being in contact with the magnet, and a displacement permission portion located in an opposite direction to a protrusion direction of the protrusion portion with respect to the protrusion portion and permitting displacement of the protrusion portion in the opposite direction. The magnet includes a front side edge portion on a front side in a magnet insertion direction, which is a direction in which the magnet is inserted into the magnet insertion hole, and on the protrusion portion side in the protrusion direction. The protrusion portion includes a tip end edge portion rearward in the magnet insertion direction at a tip end portion thereof. The rotor includes at least one of a magnet-side chamfered portion in which the front side edge portion of the magnet is chamfered and a protrusion portion-side chamfered portion in which the tip end edge portion of the protrusion portion is chamfered. A sum of a length of the magnet-side chamfered portion and a length of the protrusion portion-side chamfered portion is equal to or longer than a length of the protrusion portion in the protrusion direction of the protrusion portion as the rotor is viewed from the axial direction.

(2) In the rotor of (1), the magnet includes the magnet-side chamfered portion. A length of the magnet-side chamfered portion is equal to or longer than a length of the protrusion portion in the protrusion direction as the rotor is viewed from the axial direction.

(3) In the rotor of (1) or (2), the protrusion portion includes the protrusion portion-side chamfered portion. A length of the protrusion portion-side chamfered portion is same as a length of the protrusion portion in the protrusion direction as the rotor is viewed from the axial direction.

(4) In the rotor of any one of (1) to (3), the magnet includes the magnet-side chamfered portion. The magnet-side chamfered portion has a curved surface as viewed from the direction orthogonal to both the protrusion direction and the magnet insertion direction.

(5) In the rotor of any one of (1) to (4), an end surface of the protrusion portion includes a shear droop surface connected to a flat surface rearward in the magnet insertion direction of the protrusion portion. The protrusion portion-side chamfered portion is the shear droop surface.

(6) In the rotor of any one of (1) to (5), the magnet has a cuboid shape, and only one side constituting the front side edge portion of sides of the cuboid includes the magnet-side chamfered portion.

(7) In the rotor of any one of (1) to (5), the magnet has a cuboid shape, and edge portions of all sides extending in a direction orthogonal to both the protrusion direction and the magnet insertion direction are chamfered on both end surfaces of the magnet in the magnet insertion direction.

(8) In the rotor of any one of (1) to (7), a tip end portion of the protrusion portion digs into the magnet.

(9) In the rotor of any one of (1) to (7), the magnet has a scratch mark with the protrusion portion extending in the magnet insertion direction. A tip end of the protrusion portion is in contact with a part of the scratch mark.

(10) A motor includes the rotor of any one of (1) to (7), and stator including a stator coil and a stator core.

(11) The manufacturing method of a rotor according to the embodiment is a manufacturing method of a rotor including: a rotor core in a columnar shape having a plurality of core plates stacked in a thickness direction and a magnet insertion hole extending in an axial direction; and a magnet to be inserted into the magnet insertion hole. The manufacturing method includes: a magnet forming process of forming the magnet to be inserted into the magnet insertion hole; a plurality of core plates including a holding core plate having an insertion through hole constituting a part of the magnet insertion hole, a protrusion portion protruding from an inner surface of the insertion through hole toward an inside of the magnet insertion hole and being in contact with the magnet, and a displacement permission portion located in an opposite direction to a protrusion direction of the protrusion portion with respect to the protrusion portion and permitting displacement of the protrusion portion in the opposite direction; a core plate stacking process of stacking the plurality of core plates in a thickness direction to obtain the rotor core in a columnar shape having the magnet insertion hole extending in the axial direction; and a magnet inserting process of inserting the magnet into the magnet insertion hole of the rotor core while bringing the magnet and the protrusion portion into contact with each other. The manufacturing method of a rotor further includes at least one of a magnet-side chamfered portion forming process of forming a chamfered portion in the magnet by chamfering a front side edge portion of the magnet located on a front side in a magnet insertion direction, which is an insertion direction of the magnet with respect to the magnet insertion hole, and on the protrusion portion side in the protrusion direction, the magnet-side chamfered portion forming process being included in the magnet forming process, and a protrusion portion-side chamfered portion forming process of forming a chamfered portion in a tip end edge portion rearward in the magnet insertion direction at a tip end portion of the protrusion portion, the protrusion portion-side chamfered portion forming process being included in the core plate forming process.

A sum of a length of the magnet-side chamfered portion and a length of the protrusion portion-side chamfered portion is equal to or longer than a length of the protrusion portion in the protrusion direction of the protrusion portion as the rotor is viewed from the axial direction.

As described above, the motor 100 includes the rotors 101, 101A, 101B, or 101C, and the stator 102 including the stator coil 106 and the stator core 105. Due to this, plastic deformation of the tip end of the protrusion portion 52 is suppressed, and thus the motor 100 that can appropriately hold the magnet 2 can be obtained.

While the embodiments of the present invention have been described above, the above embodiments are merely examples for implementing the present invention. Accordingly, the present invention is not limited to the embodiments described above, and the embodiments described above may be appropriately modified and implemented without departing from the scope of the present invention.

In the first and second embodiments, the sum of a length L1 of the magnet-side chamfered portion 22 and a length L2 of the protrusion portion-side chamfered portion 56 is equal to or longer than a length L0 of the protrusion portion 52 in the protrusion direction of the protrusion portion 52 as the rotor 101 is viewed from the axial direction. However, the length of the magnet-side chamfered portion may be the same as or longer than the length of the protrusion portion. The length of the protrusion portion-side chamfered portion may be the same as the length of the protrusion portion.

In the first to third embodiments, the magnet-side chamfered portion 22 has a curved surface as viewed from a direction orthogonal to the protrusion direction and the magnet insertion direction. However, the magnet-side chamfered portion needs not be a curved surface as viewed from a direction orthogonal to the protrusion direction and the magnet insertion direction. For example, the magnet-side chamfered portion may be a part where the front side edge portion is chamfered linearly as viewed from a direction orthogonal to the protrusion direction and the magnet insertion direction.

In the first, second, and fourth embodiments, the end surface of the protrusion portion 52 includes the shear droop surface 5a connected to the flat surface rearward in the magnet insertion direction of the protrusion portion 52. The protrusion portion-side chamfered portion 56 is the shear droop surface 5a. However, the protrusion portion-side chamfered portion may be formed by processing using a chamfering tool not shown instead of the shear droop surface. For example, as viewed from a direction orthogonal to the protrusion direction and the magnet insertion direction, the protrusion portion-side chamfered portion may be a part where the tip end edge portion is chamfered on a linear inclined surface or a curved surface using a chamfering tool not shown.

In the first to fourth embodiments, the magnet 2 has a cuboid shape. However, the magnet may have a shape other than the cuboid. The magnet may have any shape that can be inserted into the magnet insertion hole and can be held by the protrusion portion. For example, the magnet may be a polygonal prism other than a quadrangular prism.

In the first to fourth embodiments, edge portions of all sides of the magnet 2 extending in a direction orthogonal to both the protrusion direction and the magnet insertion direction are chamfered on both end surfaces in the magnet insertion direction. However, in both end surfaces of the magnet in the magnet insertion direction, some sides of a plurality of sides parallel to the long direction of the front side edge portion need not be chamfered.

In the first to fourth embodiments, the plurality of holding core plates 5 are continuously stacked. However, the plurality of holding core plates need not be continuously stacked. For example, a basic core plate may be stacked between the holding core plate and the holding core plate, or a core plate that is not a basic core plate may be stacked. The rotor core may have a plurality of holding core plates continuously stacked at a plurality of locations in the axial direction.

In the first to fourth embodiments, the plurality of basic core plates 6 are continuously stacked. However, the plurality of basic core plates need not be continuously stacked. For example, a holding core plate may be stacked between the basic core plate and the basic core plate, or a core plate that is not a holding core plate may be stacked.

In the first to fourth embodiments, the plurality of basic core plates 6 are stacked on one side and the other side in the axial direction with respect to the plurality of holding core plates 5. However, the holding core plate may be located in an end portion of the rotor in the axial direction.

In the first to fourth embodiments, the protrusion portion 52 has a trapezoidal shape as the holding core plate 5 is viewed from the axial direction. However, the shape of the protrusion portion as the holding core plate is viewed from the axial direction may be, for example, a rectangular shape or a semicircular shape, and is not limited to the trapezoidal shape.

In the first to fourth embodiments, the end surface of the tip end portion of the protrusion portion 52 may be constituted by the shear droop surface 5a and the shear surface 5b arranged side by side in the thickness direction. However, the end surface of the tip end portion of the protrusion portion may have a surface that is neither a shear droop surface nor a shear surface. The end surface of the tip end portion of the protrusion portion needs not have a shear droop surface or needs not have a shear surface.

In the first to fourth embodiments, the holding core plate 5 includes two protrusion portions 52, two displacement permission portions 53, and two deformation portions 54 with respect to one insertion through hole 51. However, the holding core plate may include one protrusion portion, one displacement permission portion, and one deformation portion with respect to one insertion through hole, or may include three or more of protrusion portions, displacement permission portions, and deformation portions.

In the first to fourth embodiments, the holding core plate 5 includes the protrusion portion 52 with respect to all the insertion through holes 51. However, the holding core plate may include the protrusion portion with respect to some of the insertion through holes.

In the first to fourth embodiments, the holding core plate 5 includes the displacement permission portions 53 with respect to all the insertion through holes 51. However, the holding core plate may include the displacement permission portion with respect to some of the insertion through holes.

In the first to fourth embodiments, the holding core plate 5 includes the deformation portion 54 with respect to all the insertion through holes 51. However, the holding core plate may include the deformation portion with respect to some of the insertion through holes.

In the first to fourth embodiments, the displacement permission portion 53 has a rectangular shape. However, the through hole of the displacement permission portion may have a shape other than the rectangle. The through hole may have any shape that can cause the deformation portion to be deformed in an arrangement direction of the deformation portion and the displacement permission portion.

In the first to fourth embodiments, the plurality of displacement permission portions 53 have the same shape. However, some of the displacement permission portions may have different shapes.

The present invention can be used for a rotor of a motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor comprising:
   a rotor core in a columnar shape having a plurality of core plates stacked in a thickness direction and a magnet insertion hole extending in an axial direction; and
   a magnet inserted into the magnet insertion hole, wherein
   the plurality of core plates include:
      a plurality of sets of holding core plates, wherein every set of holding core plates of the plurality of sets of holding core plates is part of a continuous stack of multiple holding plates, each set of the plurality of sets of holding core plates defines an insertion through hole constituting a part of the magnet insertion hole, and
      a plurality of sets of basic core plates, wherein each set of the plurality of sets of basic core plates includes multiple basic core plates, and sets of the plurality of sets of basic core plates are arranged in an alternating manner with sets of the plurality of sets of holding core plates,
   a protrusion portion protruding from an inner surface of the insertion through hole toward an inside of the magnet insertion hole and being in contact with the magnet, and
   a displacement permission portion located in an opposite direction to a protrusion direction of the protrusion portion with respect to the protrusion portion and permitting displacement of the protrusion portion in the opposite direction, the magnet includes a front side edge portion on a front side in a magnet insertion direction, which is a direction in which the magnet is inserted into the magnet insertion hole, and on a side of the protrusion portion in the protrusion direction,
   the protrusion portion includes a tip end edge portion rearward in the magnet insertion direction at a tip end portion of the protrusion portion,
   the rotor includes at least one of a magnet-side chamfered portion in which the front side edge portion of the magnet is chamfered and a protrusion portion-side chamfered portion in which the tip end edge portion of the protrusion portion is chamfered, and
   a sum of a length of the magnet-side chamfered portion and a length of the protrusion portion-side chamfered portion is equal to or longer than a length of the protrusion portion in the protrusion direction of the protrusion portion as the rotor is viewed from the axial direction.

2. The rotor according to claim 1, wherein
   the magnet includes a magnet-side chamfered portion, and
   a length of the magnet-side chamfered portion is equal to or longer than a length of the protrusion portion in the protrusion direction as the rotor is viewed from the axial direction.

3. The rotor according to claim 1, wherein
   the protrusion portion includes the protrusion portion-side chamfered portion, and
   a length of the protrusion portion-side chamfered portion is same as a length of the protrusion portion in the protrusion direction as the rotor is viewed from the axial direction.

4. The rotor according to claim 1, wherein
   the magnet includes a magnet-side chamfered portion, and
   the magnet-side chamfered portion has a curved surface as viewed from a direction orthogonal to both the protrusion direction and the magnet insertion direction.

5. The rotor according to claim 1, wherein
   an end surface of the protrusion portion includes a shear droop surface connected to a flat surface rearward in the magnet insertion direction of the protrusion portion, and
   the protrusion portion-side chamfered portion is the shear droop surface.

6. The rotor according to claim 1, wherein
   the magnet has a cuboid shape, and
   only one side constituting the front side edge portion of sides of the cuboid includes the magnet-side chamfered portion.

7. The rotor according to claim 1, wherein
   the magnet has a cuboid shape, and
   edge portions of all sides extending in a direction orthogonal to both the protrusion direction and the magnet insertion direction are chamfered on both end surfaces of the magnet in the magnet insertion direction.

8. The rotor according to claim 1, wherein a tip end portion of the protrusion portion digs into the magnet.

9. The rotor according to claim 1, wherein
   the magnet has a scratch mark with the protrusion portion extending in the magnet insertion direction, and
   a tip end of the protrusion portion is in contact with a part of the scratch mark.

10. A motor comprising:
   the rotor according to claim 1; and
   a stator including a stator coil and a stator core.

11. A manufacturing method of a rotor including:

a rotor core in a columnar shape having a plurality of core plates stacked in a thickness direction and a magnet insertion hole extending in an axial direction; and a magnet to be inserted into the magnet insertion hole, the manufacturing method comprising:

a magnet forming process of forming the magnet to be inserted into the magnet insertion hole;

a core plate forming process of forming a plurality of core plates including:

a plurality of sets of holding core plates, wherein every set of holding core plates of the plurality of sets of holding core plates is part of a continuous stack of multiple holding plates, each set of the plurality of sets of holding core plates defines an insertion through hole constituting a part of the magnet insertion hole constituting a part of the magnet insertion hole, and a plurality of sets of basic core plates, wherein each set of the plurality of sets of basic core plates includes multiple basic core plates, and sets of the plurality of sets of basic core plates are arranged in an alternating manner with sets of the plurality of sets of holding core plates, a protrusion portion protruding from an inner surface of the insertion through hole toward an inside of the magnet insertion hole and being in contact with the magnet, and a displacement permission portion located in an opposite direction to a protrusion direction of the protrusion portion with respect to the protrusion portion and permitting displacement of the protrusion portion in the opposite direction;

a core plate stacking process of stacking the plurality of core plates in a thickness direction to obtain the rotor core in a columnar shape having the magnet insertion hole extending in the axial direction; and a magnet inserting process of inserting the magnet into the magnet insertion hole of the rotor core while bringing the magnet and the protrusion portion into contact with each other, the manufacturing method of a rotor further comprising at least one of a magnet-side chamfered portion forming process of forming a chamfered portion in the magnet by chamfering a front side edge portion of the magnet located on a front side in a magnet insertion direction, which is an insertion direction of the magnet with respect to the magnet insertion hole, and on a side of the protrusion portion in the protrusion direction, the magnet-side chamfered portion forming process being included in the magnet forming process, and a protrusion portion-side chamfered portion forming process of forming a chamfered portion in a tip end edge portion rearward in the magnet insertion direction at a tip end portion of the protrusion portion, the protrusion portion-side chamfered portion forming process being included in the core plate forming process, wherein a sum of a length of the magnet-side chamfered portion and a length of the protrusion portion-side chamfered portion is equal to or longer than a length of the protrusion portion in the protrusion direction of the protrusion portion as the rotor is viewed from the axial direction.

\* \* \* \* \*